(12) United States Patent
Thongjitti et al.

(10) Patent No.: US 9,150,345 B2
(45) Date of Patent: Oct. 6, 2015

(54) FASTENER CONTAINER TO PROVIDE FASTENERS TO A FASTENER FEEDER

(75) Inventors: Teerach Thongjitti, Bangkok (TH); Kwanmuang Trainuch, Patumthani (TH); Chatree Seetangkum, Nongkhai (TH); Komgrit Sungkhaphong, Klongsaamwa (TH)

(73) Assignee: Western Digital Technologies, Inc., Irvine, CA (US)

( * ) Notice: Subject to any disclaimer, the term of this patent is extended or adjusted under 35 U.S.C. 154(b) by 23 days.

(21) Appl. No.: 13/429,176

(22) Filed: Mar. 23, 2012

(65) Prior Publication Data

US 2013/0248545 A1 Sep. 26, 2013

(51) Int. Cl.
| | |
|---|---|
| G01F 11/10 | (2006.01) |
| B65D 83/00 | (2006.01) |
| B23P 19/00 | (2006.01) |
| B65G 47/14 | (2006.01) |

(52) U.S. Cl.
CPC ........... B65D 83/0016 (2013.01); B23P 19/003 (2013.01); B65G 47/1471 (2013.01)

(58) Field of Classification Search
CPC ..... G01F 11/24; B65B 1/366; B01F 15/0219; B65G 65/4881
USPC .............. 222/129, 132, 135, 136, 185.1, 284, 222/305, 363, 366, 368, 424.5, 426, 252, 222/270, 271, 265, 266, 269, 273, 274, 138, 222/268, 264, 142; 221/268, 271, 272, 273, 221/274, 275, 277, 263, 93, 95, 112, 14
See application file for complete search history.

(56) References Cited

U.S. PATENT DOCUMENTS

| | | | | | |
|---|---|---|---|---|---|
| 315,168 | A | * | 4/1885 | Riter | 222/268 |
| 446,636 | A | * | 2/1891 | Kirkpatrick | 222/233 |
| 857,742 | A | * | 6/1907 | Lanquist | 366/19 |
| 982,089 | A | * | 1/1911 | Patric | 222/328 |
| 1,023,894 | A | * | 4/1912 | Jass | 222/268 |
| 1,237,919 | A | * | 8/1917 | Linkiewicz | 194/295 |
| 1,357,631 | A | * | 11/1920 | Fried | 194/276 |
| 1,502,314 | A | * | 7/1924 | Mojonnier et al. | 141/100 |
| 1,518,933 | A | * | 12/1924 | Kantor | 221/196 |
| 1,540,290 | A | * | 6/1925 | Selinger et al. | 119/56.1 |
| 1,544,765 | A | * | 7/1925 | Lawrence | 366/162.2 |
| 1,572,981 | A | * | 2/1926 | Aldrich et al. | 119/56.1 |
| 1,621,307 | A | * | 3/1927 | Benzel | 222/139 |
| 1,636,910 | A | * | 7/1927 | Hardy | 222/339 |
| 1,675,510 | A | * | 7/1928 | Nolan | 221/93 |
| 1,871,000 | A | * | 8/1932 | Klostermann | 194/296 |
| 2,224,797 | A | * | 12/1940 | Pinder | 222/131 |
| 2,230,846 | A | * | 2/1941 | Pettett | 111/95 |
| 2,352,809 | A | * | 7/1944 | Strauss | 222/156 |

(Continued)

*Primary Examiner* — Paul R Durand
*Assistant Examiner* — Randall Gruby

(57) ABSTRACT

Disclosed is a fastener container to provide fasteners to a fastener feeder for use in fastener driving operations. The fastener container may comprise a fastener housing and a rotating fastener mechanism. The fastener housing may include a plurality of fastener chambers, wherein each of the fastener chambers is configured to hold a plurality of fasteners. The rotating fastener mechanism may be located within the fastener housing and may include a plurality of bins. Each bin may be configured to receive fasteners from an adjacent fastener chamber of the fastener housing. The rotating fastener mechanism may be rotatable, such that, when a rotation occurs, a first bin drops fasteners to the fastener feeder and a second bin receives fasteners from an adjacent fastener chamber of the fastener housing.

15 Claims, 4 Drawing Sheets

(56) References Cited

U.S. PATENT DOCUMENTS

| | | | | |
|---|---|---|---|---|
| 2,532,698 A * | 12/1950 | Corkins | ................ | 222/139 |
| 2,655,291 A * | 10/1953 | Roundtree | ................ | 222/181.3 |
| 2,779,502 A * | 1/1957 | Ackerman, Jr. | ................ | 222/48 |
| 2,844,284 A * | 7/1958 | Ackerman, Jr. | ................ | 222/139 |
| 2,906,437 A * | 9/1959 | Wallis | ................ | 222/623 |
| 2,965,262 A * | 12/1960 | Du Bois | ................ | 221/115 |
| 3,056,529 A * | 10/1962 | De Shon et al. | ................ | 221/15 |
| 3,095,114 A * | 6/1963 | Tobias | ................ | 221/114 |
| 3,604,080 A * | 9/1971 | Smith | ................ | 445/35 |
| 3,606,965 A * | 9/1971 | Cortelyou | ................ | 222/312 |
| 3,729,121 A * | 4/1973 | Cannon | ................ | 222/185.1 |
| 3,754,686 A * | 8/1973 | Karlen | ................ | 222/238 |
| 3,767,089 A * | 10/1973 | McKee et al. | ................ | 222/221 |
| 3,911,582 A * | 10/1975 | Rohm et al. | ................ | 222/139 |
| 3,913,791 A * | 10/1975 | Sollerud | ................ | 222/139 |
| 3,955,513 A * | 5/1976 | Akeyson | ................ | 111/8 |
| 4,027,788 A * | 6/1977 | Parker et al. | ................ | 222/614 |
| 4,066,186 A * | 1/1978 | Agey | ................ | 222/48 |
| 4,162,751 A * | 7/1979 | Hetland et al. | ................ | 222/293 |
| 4,238,025 A * | 12/1980 | Manservisi | ................ | 198/450 |
| 4,264,023 A * | 4/1981 | Stocks et al. | ................ | 222/614 |
| 4,277,003 A * | 7/1981 | Tabuchi et al. | ................ | 222/350 |
| 4,308,974 A * | 1/1982 | Jones | ................ | 221/196 |
| 4,372,338 A * | 2/1983 | Efferson | ................ | 137/240 |
| 4,448,331 A * | 5/1984 | Millette et al. | ................ | 222/185.1 |
| 4,536,121 A * | 8/1985 | Stewart et al. | ................ | 414/219 |
| 4,993,364 A * | 2/1991 | Hessenauer | ................ | 119/51.11 |
| 5,002,084 A * | 3/1991 | Wilson | ................ | 137/15.24 |
| RE34,776 E * | 11/1994 | Pratt | ................ | 366/141 |
| 5,425,473 A | 6/1995 | Kvalheim | | |
| 5,833,097 A * | 11/1998 | Ruth | ................ | 222/368 |
| 6,186,373 B1 | 2/2001 | Johanson | | |
| 6,336,573 B1 | 1/2002 | Johanson | | |
| 6,487,987 B1 * | 12/2002 | Choi | ................ | 119/51.5 |
| 6,871,762 B1 * | 3/2005 | Cripps | ................ | 222/142.3 |
| 6,991,134 B2 * | 1/2006 | Bailey | ................ | 222/189.02 |
| 7,273,157 B2 | 9/2007 | Kvalheim | | |
| D562,079 S * | 2/2008 | Shlomo et al. | ................ | D7/589 |
| 7,461,763 B1 | 12/2008 | Winn | | |
| 7,648,047 B2 | 1/2010 | Lewis et al. | | |
| 8,297,477 B2 * | 10/2012 | Brickl et al. | ................ | 222/308 |
| D702,293 S * | 4/2014 | Logue | ................ | D20/1 |
| 8,820,537 B2 | 9/2014 | Peng et al. | ................ | 209/541 |
| 2004/0251281 A1* | 12/2004 | Lasser et al. | ................ | 222/368 |
| 2006/0027609 A1* | 2/2006 | Landau et al. | ................ | 222/434 |
| 2010/0044398 A1* | 2/2010 | Brickl et al. | ................ | 222/287 |
| 2010/0258586 A1* | 10/2010 | Ryan et al. | ................ | 222/1 |
| 2013/0248545 A1* | 9/2013 | Thongjitti et al. | ................ | 221/1 |

* cited by examiner

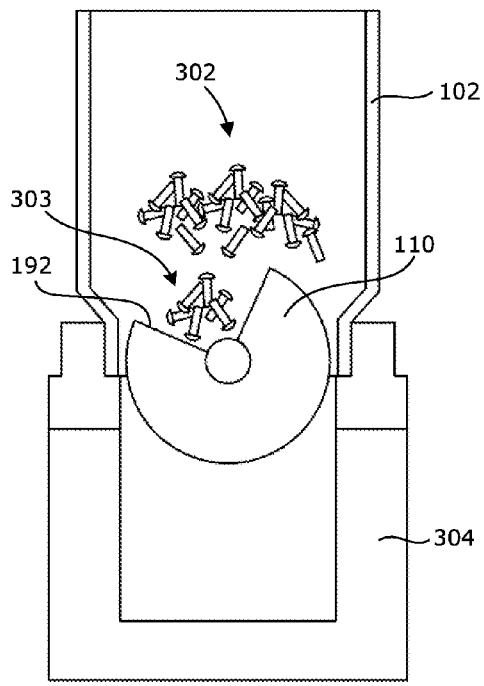
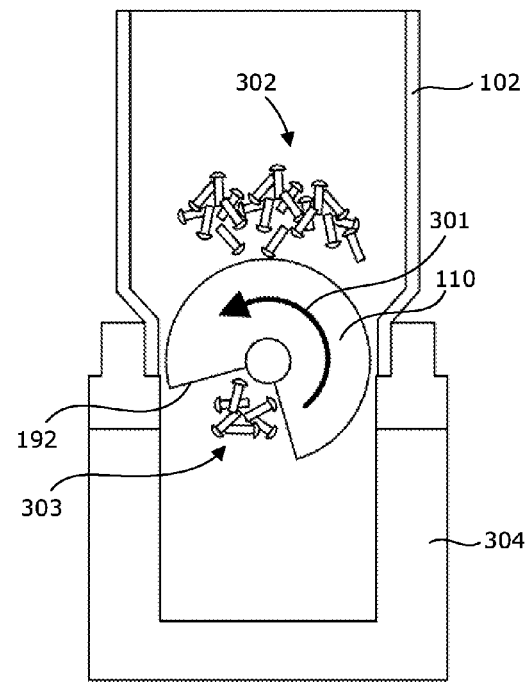
FIG. 3A     FIG. 3B

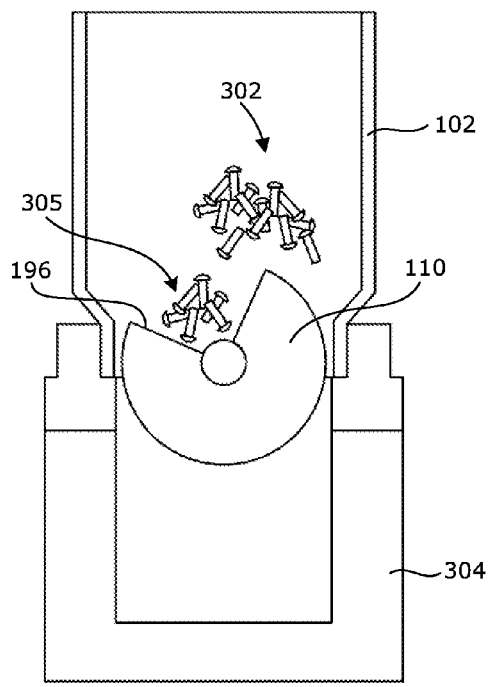
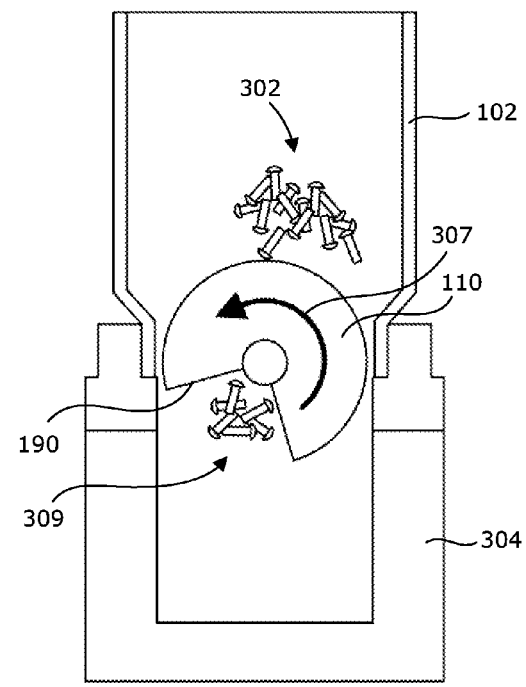
FIG. 3C　　　　　　　FIG. 3D

FASTENER CONTAINER TO PROVIDE FASTENERS TO A FASTENER FEEDER

BACKGROUND

During the manufacturing of devices (e.g., mechanical, electromechanical, and electrical devices), a fastener container is often utilized to provide fasteners to a fastener feeder for use in fastener driver operations. The fasteners are typically provided by the fastener feeder to a driver that drives the fastener (e.g., a screw, plug, bolt, rivet, etc.) to connect together components of the device being manufactured. As an example, fastener drivers are often used in large volume manufacturing for high-tech devices.

One example of a high-tech device that is often manufactured utilizing a fastener driver is a hard disk drive (HDD). A HDD typically includes a head disk assembly (HDA) including at least one magnetic disk, a disk clamp and a disk fastener to mount the disk to a spindle motor that rapidly rotates the disk, and a head stack assembly (HSA) that includes a moveable actuator arm and a head gimbal assembly (HGA) with a moveable transducer head for reading and writing data from and to the disk. During the manufacturing of a disk drive, a fastener driver may be utilized to attach components together of the disk drive being manufactured, such as, latches, ramps, disks, spindle motors, disk clamps, and various other HDA, HSA, and HGA components.

Due to the cost competiveness of the high-tech industry, and as an example of this, the disk drive industry, the components of a disk drive need to be assembled in a very precise and cost effective manner. In order to be cost effective, complex components of the disk drive, such as disk clamps, disks, spindle motors, HDAs, HGAs, etc., need to be assembled, with fasteners, such as screws, in a very time effective manner with a very low error rate—even though many of the components require highly precise assembly. Also, many of these types of components often need to be assembled in a clean room environment in which debris and contamination particles are kept to a minimum.

In high-tech manufacturing operations, such as, for disk drives, where cost and quality are crucial measurements, the refilling of fasteners to the fastener feeder for fastener driving operations is one of the main operational points at which large amounts of fasteners may be lost and at which contamination may occur. It has been observed that when fasteners are dropped onto the clean room of the manufacturing facility that many of the fasteners are damaged and have to be discarded. This significantly increases manufacturing costs. Further, these dropped fasteners also increase the amount of contamination in the manufacturing process. This is especially problematic for the manufacturing of high-tech devices, such as disk drives, in which both costs and the reduction of contamination is important. Unfortunately, when a fastener is dropped to the floor, contaminated particles often flow into the device being manufactured reducing device quality.

Accordingly, more efficient techniques for providing fasteners to a fastener feeder for use in fastener driving operations in the manufacturing of devices are sought after to reduce both manufacturing costs and to reduce debris and contamination.

BRIEF DESCRIPTION OF THE DRAWINGS

FIGS. 3A-3D show diagrams illustrating a fastener housing of the fastener container holding fasteners that are received by bins of a rotating fastener mechanism that due to the rotation of the rotating fastener mechanism are dropped to the fasteners feeder, according to one embodiment of the invention.

DETAILED DESCRIPTION

Figure 1:
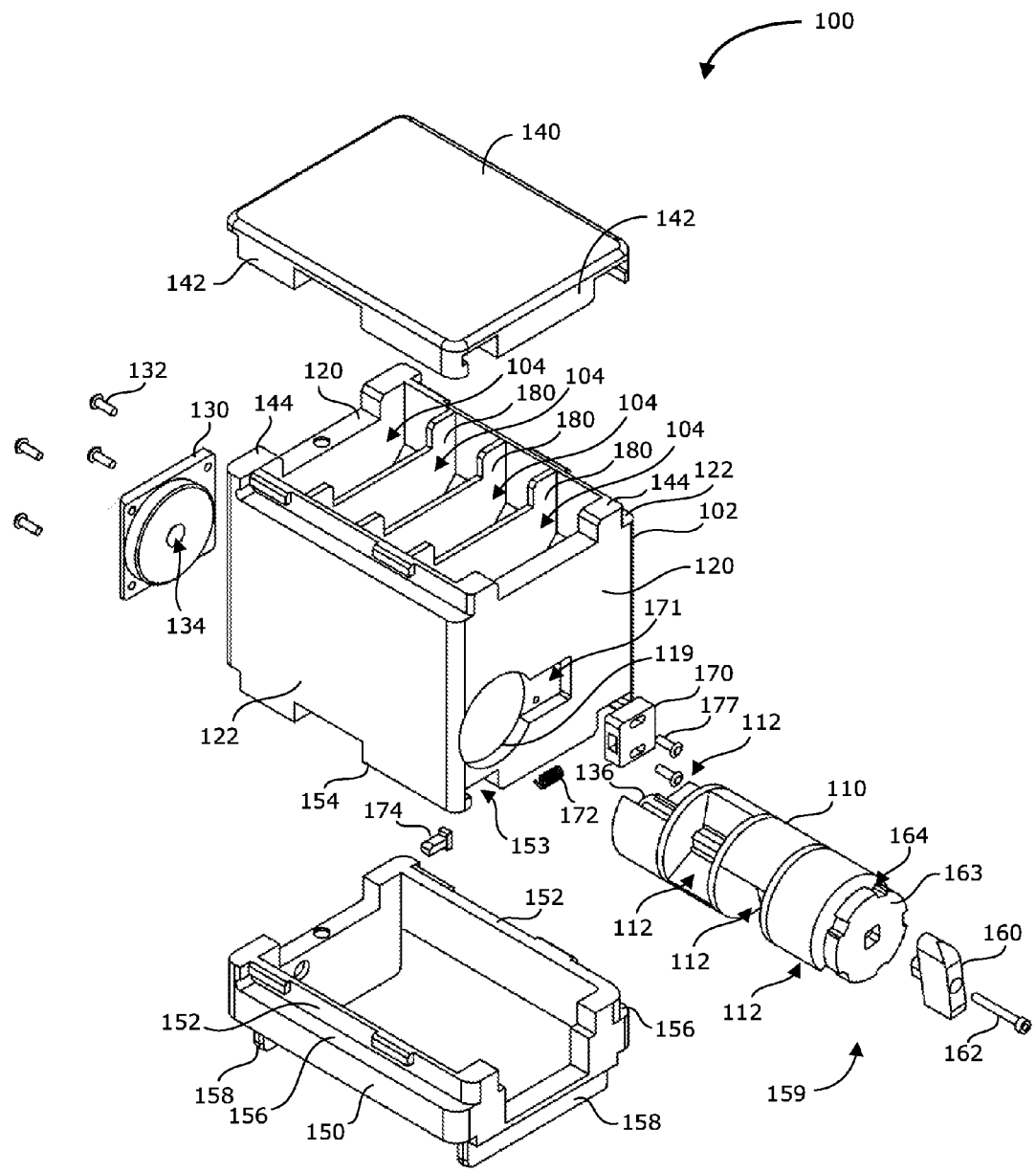
FIG. 1 is an exploded view of a fastener container that can be used to provide fasteners to a fastener feeder, according to one embodiment of the invention.
Figure 2:
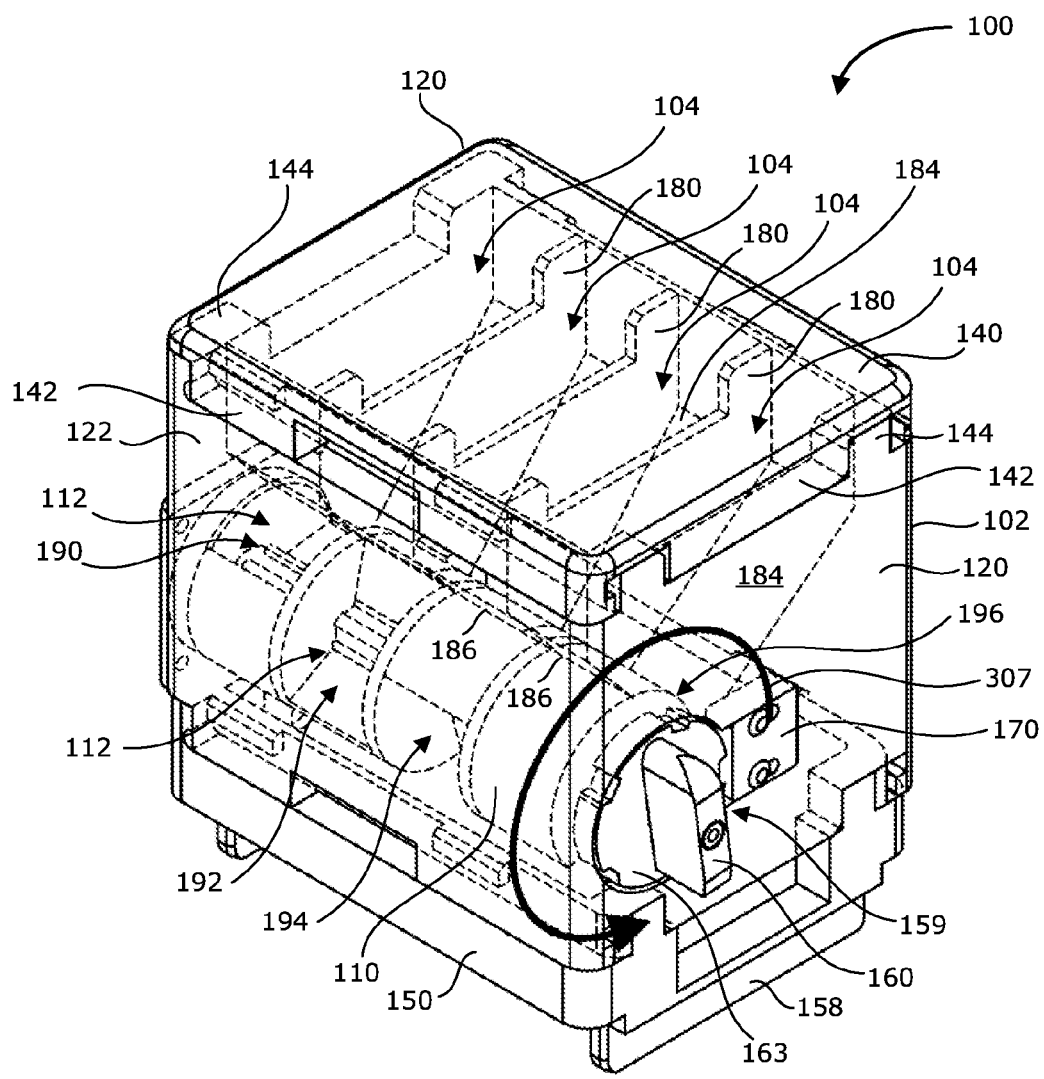
FIG. 2 is a perspective view of the fastener container that can be used to provide fasteners to the fastener feeder, according to one embodiment of the invention.

With reference to FIGS. 1 and 2, a fastener container 100 to provide fasteners to a fastener feeder for use in fastener driving operations, according to one embodiment of the invention, will be hereinafter described. Fastener container 100 may comprise a fastener housing 102 that includes a plurality of fasteners chambers 104. Each fastener chamber 104 may be configured to hold a plurality of fasteners that may be dropped by a rotating fastener mechanism 110 to a fastener feeder (not shown) for use in fastener driving operations. The rotating fastener mechanism 110 may be mounted within the fastener housing 102. The rotating fastener mechanism 110 may include a plurality of bins 112. Each bin 112 may be configured to receive fasteners from an adjacent fastener chamber 104 of the fastener housing 102. As will be described, the rotating fastener mechanism 110 is rotatable, such that, when a rotation occurs, a first bin 112 may drop fasteners to the fastener feeder and a second bin 112 may receive fasteners from an adjacent fastener chamber 104 of the fastener housing 102. It is noted in other embodiments, instead of dropping the fasteners to the feeder, the rotating fastener mechanism may be configured to drop the fasteners to other equipment used in manufacturing.

With brief reference to FIGS. 3A-3D that show example embodiments, rotating fastener mechanism 110 may be rotated (see arrow line 301) such that a first bin 192 drops fasteners 303 to fastener feeder 304 (FIGS. 3A-3B) and a second bin 196 receives fasteners 305 from an adjacent fastener chamber of the fastener housing 102 (see FIG. 3C). When rotating fastener mechanism 110 is rotated again (see arrow line 307, FIG. 3D), another previously filled bin 190 drops fasteners 309 to fastener feeder 304 and another bin (not shown) receives fasteners 302 from an adjacent fastener chamber of the fastener housing 102. In this example, in which there are four chambers and four bins, the rotating fastener mechanism 110 may be continued to be rotated until all of the fasteners 302 are dropped to the fastener feeder 304. This process will be described later in more detail.

With particular reference again to FIGS. 1 and 2, in one embodiment, the fastener housing 102 may be approximately rectangularly-shaped having parallel front and back walls 120 and parallel side walls 122. The rotating fastener mechanism 110 may be cylindrically-shaped and each bin 112 may be formed as a cut-out portion of the rotating fastener mechanism 110. The rotating fastener mechanism 110 may be mounted through a cylindrical hole 119 formed in the front wall 120 of the fastener housing 102 and may be attached to the back wall 120 of the fastener housing 102 by a lock gear 130.

In this example, lock gear 130 may be mounted into a properly-sized hole of the back wall 120 and may be mounted to the back wall 120 by screws 132. The lock gear 130 may include an opening 134 having a gear that receives a cylindrical shaft 136 of the rotating fastener mechanism 110 such that the rotating fastener mechanism 110 is rotatably mounted within the fastener housing 102. Further, the other end of the rotating fastener mechanism 110 is mounted within the cylindrical hole 119 of the front wall 120 of the fastener housing 102 such that the rotating fastener mechanism 110 is rotatably mounted within the fastener housing 102.

Also, an approximately rectangularly-shaped cover 140 may be mounted to the top of the fastener housing 102. Cover 140 may prevent fasteners and debris from exiting the fastener housing 102 after it is placed on top of the fastener housing 102. Cover 140 may have descending walls 142 with openings that are configured to mate with ascending walls 144 and openings of the fastener housing 102 such that cover 140 securely mates with the fastener housing 102. Cover 140 may be formed from transparent plastic material and may be see-through or may be formed from opaque plastic material and may not be see-through.

Further, the fastener container 100 may include an approximately rectangularly-shaped base 150 that mates with the bottom portion of the fastener housing 102. The base 150 may have upward extending sidewalls 152 that extend into channels 153 of the side walls 122 of the fastener housing 102. Also, bottom portions 154 of the side walls 122 of the fastener housing 102 may abut against mounting portions 156 of the base 150. Base 150 may further include downward walls 158 that are placed within the top of a fastener feeder (not shown) and mounts the bottom portion of the fastener housing 102 to the fastener feeder such that fasteners from the fastener housing fall into the fastener feeder for use in fastener driving operations by a fastener driver.

The rotating fastener mechanism 110 may include rotation controller 159 that includes a handle 160 that is mounted by a screw 162 to a gear 163 having a plurality of index gear openings 164. The handle 160 may be utilized as part of the rotation controller 159 that is configured to control the rotating of the rotating fastener mechanism 110 such that the rotating fastener mechanism 110 is rotated to predetermined angles corresponding to the bins 112 such that the bins 112 receive fasteners from adjacent fastener chambers 104 of the fastener housing 102 and such that the bins 112 drop fasteners to the fastener feeder.

Additionally, the rotation controller 159 may include a spring loaded lock 170 that interacts with the index gear openings 164 of the gear 163 of the rotating fastener mechanism mounted within a housing of the spring loaded lock 170. The spring loaded lock 170 may be mounted within a suitably-shaped opening 171 of the front wall 120 of the fastener housing 102 via screws 177 such that it interacts with the index gear openings 164 of the rotating fastener mechanism 110. By rotating the rotating fastener mechanism 110 via handle 160 in conjunction with the spring loaded lock 170 that interacts with the index gear openings 164, the rotation of the rotating fastener mechanism 110 is controlled such that the rotating fastener mechanism 110 is rotated to predetermined angles. It should be appreciated that although a handle is shown for human rotation that the rotating controller 159 may also be controlled robotically with or without the use of a handle and/or a locking mechanism and may be controlled manually by manufacturing personnel or automatically by a computer.

Thus, the rotating fastener mechanism 110 is rotatable, such that, when a rotation occurs, such as through the rotation controller 159, a first bin 112 of the rotating fastener mechanism 110 may drop fasteners to the fastener feeder whereas another second bin 112 may receive fasteners from an adjacent fastener chamber 104 of the fastener housing 102. Each bin 112 may be configured to receive fasteners from an adjacent fastener chamber 104 in the fastener housing 102 at a first predetermined angle corresponding to the bin 112 and may then drop the fasteners contained in the bin 112 to the fastener feeder when the rotating fastener mechanism 110 is rotated to a second predetermined angle corresponding to the bin 112, as will be described.

In one example embodiment, the fastener container 100 may include four fastener chambers 104 and the rotating fastener mechanism 110 may include four corresponding bins 112. The four fastener chambers 104 of the fastener housing 102 may be defined by three chamber walls 180 and the front and back walls 120 of the fastener housing 102. Further, the fastener chambers 104 are each defined by a pair of opposed angled walls 184 and 186 (see FIG. 2 in phantom lines). The angled walls 184 extend all the way down to the bottom portion of the rotating fastener mechanism 110 and abut against the bottom portion of the rotating fastener mechanism 110 and the other opposed angled walls 186 extend downward to the top portion of the rotating fastener mechanism 110 and abut against the top portion of the rotating fastener mechanism 110. In this way, the fastener chambers 104 are defined by the front and back walls 120 of the fastener housing 102, the chamber walls 180, and the angled walls 184 and 186 that abut against the rotating fastener mechanism 110 to create closed chambers to hold the fasteners against the rotating fastener mechanism 110.

Therefore, when the plurality of fastener chambers 104 of the fastener housing 102 are filled with fasteners by manufacturing personnel they are fully contained within each fastener chamber 104 and abut against the outside portion of the rotating fastener mechanism 110 without falling into the feeder. It should be noted that in this example, the fasteners may initially be contained in one or two of the bins after fastener loading (e.g., 190 or 190 and 192—dependent upon the design of the chambers), and that as the rotating fastener mechanism 110 is rotated to proper positions under the control of rotation controller 159, fasteners are dropped from their associated bin 112 of the rotating fastener mechanism 110 to the fastener feeder and also fasteners are received in the bins 112 of the rotating fastener mechanism 110 from adjacent fasteners chambers 104.

As an example, bin 190 and bin 192 of the rotating fastener mechanism 110 may be filled with fasteners from fastener chambers 104 (e.g., this may due to initial fastener loading of bin 192 and a rotation resulting in the filling of bin 190), whereas bin 194 and bin 196 may be empty and have not yet received fasteners from the fastener chambers 104. When the rotating fastener mechanism 110 is turned by handle 160, rotating fastener mechanism 110 is rotated by a predetermined angle (e.g., 72 degrees) as controlled by the rotation controller 159 and the index gear 163. In this example, the index gear 163 has five index gear openings 164 such that each rotation is approximately 72 degrees. When a rotation occurs (e.g., line 307), bin 190 may rotate downwards, bin 192 may rotate downwards and drop its fasteners to the fastener feeder, bin 194 may rotate upwards, and bin 196 may rotate upwards to receive fasteners stored in the adjacent fastener chamber 104. In this way, each bin (190, 192, 194, and 196) is configured to receive fasteners from an adjacent fastener chamber 104 when it is at a particular predetermined angle corresponding to the bin and to drop fasteners contained in the bin to the fastener feeder when the rotating fastener mechanism 110 is rotated to the other predetermined angle corresponding to the bin. Thus, the rotating fastener mechanism 110 is rotatable, such that, when a rotation occurs, a bin drops fasteners to the fastener feeder and another bin receives fasteners from an adjacent fastener chamber 104 of the fastener housing 102.

It should be noted that in the previous example, when the rotating fastener mechanism 110 is turned by handle 160, rotating fastener mechanism 110 is rotated by a predetermined angle of 72 degrees as controlled by the index gear 163 of the rotation controller 159 which has five slots. In the previous example, bin 192 had already been filled with fasteners from its associated fastener chamber 104 when all of the fastener chambers 104 were filled with fasteners by manufacturing personnel. Next, the rotating fastener mechanism 110 is rotated by 72 degrees and bin 190 is filled with fasteners from an associated fastener chamber 104, but at this point, neither of the bins 190 or 192 have dropped fasteners to the fastener feeder. When a next 72 degree rotation occurs rotation occurs, bin 190 may rotate downwards 72 degrees without dropping fasters, bin 192 may rotate downwards 72 degrees and drop its fasteners to the fastener feeder, bin 194 may rotate upwards by 72 degrees, and bin 196 may rotate upwards 72 degrees to receive fasteners stored in an adjacent fastener chamber 104. In this example, it will take five 72 degree rotations to return the rotating fastener mechanism 110 to the original position. However, it should be appreciated that the index gear 163 may be configured with four slots such that the rotating fastener mechanism 110 is rotated by a predetermined angle of 90 degrees such that it will take four rotations to return the rotating fastener mechanism 110 to the original position. Similarly, many other angular configurations may be set up such as 180 degrees, 120 degrees, etc., dependent upon design considerations. Additionally, although 4 chambers/4 bins have been illustrated, it should be appreciated that any number of chambers of the fastener housing 102 and corresponding bins of the rotating fastener mechanism 110 may be chosen, such as: 1 chamber/1 bin; 2 chambers/2 bins; 3 chambers/3 bins; 5 chambers/5 bins; 6 chambers/6 bins; etc.—dependent upon design considerations.

With additional reference to FIGS. 3A-3D, an example is provided to illustrate the fastener chambers of the fastener housing 102 holding fasteners 302 that are received by the bins of the rotating fastener mechanism 110 and that due to the rotation of the rotating fastener mechanism 110 are dropped to the fasteners feeder 104 to which the fastener housing 102 is mounted. Looking at FIG. 3A, bin 192 holds fasteners 303 that it received from an adjacent fastener chamber of the fastener housing 102. Looking at FIG. 3B, the rotating fastener mechanism 110 may be rotated (see arrow line 301) such that bin 192 drops fasteners 303 to the fastener feeder 304. At the same time, as can be seen in FIG. 3C, another bin 196 may receive fasteners 305 from an adjacent fastener chamber of the fastener housing 102. It should be noted that the other fasteners 302 still remain in other bins 190 and 194 or adjacent fasteners chambers. Looking at FIG. 3D, when rotating fastener mechanism 110 is rotated again (see arrow line 307), another previously filled bin 190 may drop fasteners 309 to fastener feeder 304 and another bin (e.g., bin 194, not shown) may receive fasteners 302 from an adjacent fastener chamber of the fastener housing 102.

In this example, in which there are four chambers and four bins, the rotating fastener mechanism 110 may be continued to be rotated until all of the fasteners 302 are dropped to the fastener feeder 304. It should be appreciated that this is just an example in which the fastener housing 102 has four chambers and the rotating fastener mechanism 110 has four bins. In this example, manufacturing personnel may load the fasteners 302 into the four chambers of the fastener housing 102 which may be received by a first bin of the rotating fastener mechanism 110 (and a second bin dependent on the design of the chambers), and after a first or second rotation, bins may begin dropping fasteners to the fastener feeder 304 and receiving fasteners 302 from the chambers. Although 4 chambers/4 bins have been illustrated, it should be appreciated that any number of chambers of the fastener housing 102 and corresponding bins of the rotating fastener mechanism 110 may be chosen, such as: 1 chamber/1 bin; 2 chambers/2 bins; 3 chambers/3 bins; 5 chambers/5 bins; 6 chambers/6 bins; etc.—dependent upon design considerations.

It should be appreciated that fastener feeders and fastener driving devices for manufacturing devices are well known in the art and that embodiments of the invention relate to the fastener housing 102 that may be used with a wide variety of different types of fastener feeders and fastener driving devices. Further, as an example, a fastener 302 may be a screw. However, the fastener 302 may be any suitable type of fastener such as a screw, rivet, bolt, pin, etc. As one example, the fastener 302 may be a screw used in a screw driving operation in assembling a disk drive. In this example, screws 302 may be provided by the fastener feeder 304 to a screw driving device (not shown) that drives the screws to connect together components of the disk drive being manufactured, such as, latches, ramps, disks, spindle motors, disk clamps, HDA, HSA, HGA, and other disk drive components. However, it should be appreciated that the fastener container, according to embodiments of the invention, may be utilized in any assembly of any type of mechanical, electromechanical, or electrical device that utilizes fasteners.

It should also be noted that the fastener housing 102 may be easily placed on existing screw feeders 304. Further, when the rotating fastener mechanism 110 becomes empty, the fastener housing 102 may be easily removed by manufacturing personnel, while the fastener feeder 304 is still operating without interruption of the current process, and may be refilled with fasteners 302, and then may be placed again on the fastener feeder 304. Thus, the chambers of the fastener housing 102 may be easily filled with a new batch of fasteners and may then be easily placed back on top of the fastener feeder 304 for operation.

Numerous benefits are provided by the use of the fastener housing 102. For example, particle-contamination in the manufacturing process is reduced by reducing the amount of fasteners that accidently fall onto the clean room floor because the fastener housing 102 is filled off-line and because the fastener housing is covered by a cover 140. Further, because the fasteners are contained within the fastener housing 102 with a cover 104, metallic dust remains within the fastener feeder 102 and is not dispensed widely into the air such that the clean room in which the manufacturing of devices occurs has less contamination from fasteners. Further, the number of fasteners (e.g. screws, rivets, plugs, etc.) that need to be discarded because they fall on the clean room floor is significantly reduced thereby reducing costs. In clean rooms where hundreds or thousands (or even more) fastener feeder machines are in operation, this reduction in dropped fasteners and fastener contamination is significant.

Thus, the fastener container previously described may be utilized in the manufacturing of any type of device (e.g., mechanical, electromechanical, electrical, etc.), and especially high-tech devices, such as disk drives, for manufacturing operations that desire an efficient delivery of fasteners with reduced contamination risks.

While embodiments of the invention and their various electrical, electromechanical, mechanical, and functional components have been described in particular embodiments, it should be appreciated that the embodiments can be implemented with a wide variety of differing electrical, electromechanical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

What is claimed is:

1. A fastener system comprising:
a fastener feeder; and
a fastener container including:
a fastener housing including a front wall, a back wall, a first sidewall, and a second blocking sidewall to contain a plurality of fastener chambers, wherein each of the fastener chambers is configured to hold a plurality of fasteners; and
a rotating fastener mechanism located within the fastener housing, wherein the rotating fastener mechanism includes a plurality of bins that are adjacent to one another, and each bin comprises a cut-out portion to receive and contain fasteners therein from an adjacent fastener chamber of the fastener housing, each fastener chamber corresponding to only one bin, wherein the rotating fastener mechanism is rotatable, such that, when a rotation occurs, a first bin drops fasteners to the fastener feeder and a second bin receives fasteners from an adjacent fastener chamber of the fastener housing, and wherein the cut-out portion of the second bin is formed in the rotating fastener mechanism such that fasteners received and contained in the second bin abut against and are blocked by the second blocking sidewall of the fastener housing from dropping to the fastener feeder and, after one or more rotations of the rotating fastener mechanism, the second bin is opened relative to the fastener housing to allow the second bin to drop fasteners to the fastener feeder.

2. The fastener system of claim 1, wherein each bin is configured to receive fasteners from a fastener chamber in the fastener housing at a first predetermined angle corresponding to the bin and then drop the fasteners contained in the bin to the fastener feeder when the rotating fastener mechanism is rotated to a second predetermined angle corresponding to the bin.

3. The fastener system of claim 2, further comprising a rotation controller configured to control fastener mechanism such that the rotating fastener mechanism is rotated to the predetermined angles corresponding to the bins.

4. The fastener system of claim 3, wherein the rotation controller comprises a spring loaded lock that interacts with an index gear of the rotating fastener mechanism.

5. The fastener system of claim 1, wherein the rotating fastener mechanism is cylindrically shaped.

6. The fastener system of claim 1, further comprising a cover mounted to the top of the fastener housing to prevent fasteners and debris from exiting the fastener container.

7. The fastener system of claim 1, wherein the fastener is a screw.

8. The fastener system of claim 7, wherein the screw is used in a screw driving operation in assembling a disk drive.

9. A method to provide fasteners to a fastener feeder for use in a fastener driving operation, the method comprising:
holding a plurality of fasteners in a plurality of fastener chambers of a fastener housing; and
rotating a rotating fastener mechanism located with the fastener housing, wherein the rotating fastener mechanism includes a plurality of bins that are adjacent to one another, and each bin comprises a cut-out portion to receive and contain fasteners therein from an adjacent fastener chamber, each fastener chamber corresponding to only one bin, such that, when a rotation occurs, a first bin drops fasteners to the fastener feeder and a second bin receives fasteners from an adjacent fastener chamber, and wherein the rotating fastener mechanism is shaped such that fasteners received and contained in the second bin are blocked by the fastener housing from dropping to the fastener feeder and, after one or more rotations of the rotating fastener mechanism, the second bin is opened relative to the fastener housing to allow the second bin to drop fasteners to the fastener feeder.

10. The method of claim 9, further comprising:
receiving fasteners from a fastener chamber at a first predetermined angle into a corresponding bin; and
rotating the rotatable fastener mechanism to a second predetermined angle such that the fasteners contained in the corresponding bin are dropped to the fastener feeder.

11. The method of claim 10, further comprising controlling the rotation of the rotating fastener mechanism such that the rotating fastener mechanism is rotated to the predetermined angles corresponding to the bins.

12. The method of claim 9, wherein the rotating fastener mechanism is cylindrically shaped.

13. The method of claim 9, further comprising mounting a cover to the top of the fastener housing to prevent fasteners and debris from exiting the fastener container.

14. The method of claim 9, wherein the fastener is a screw.

15. The method of claim 14, wherein the screw is used in a screw driving operation in assembling a disk drive.

* * * * *